United States Patent
Rope et al.

(10) Patent No.: US 10,826,621 B2
(45) Date of Patent: *Nov. 3, 2020

(54) RX DELAY LINE INTEFEROMETER TRACKING IN CLOSED-LOOP MODULE CONTROL FOR COMMUNICATION

(71) Applicant: INPHI CORPORATION, Santa Clara, CA (US)

(72) Inventors: Todd Rope, Santa Clara, CA (US); Sung Choi, Santa Clara, CA (US); James Stewart, Santa Clara, CA (US); Radhakrishnan L. Nagarajan, Santa Clara, CA (US); Paul Yu, Santa Clara, CA (US); Ilya Lyubomirsky, Santa Clara, CA (US)

(73) Assignee: INPHI CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,472

(22) Filed: Dec. 19, 2019

(65) Prior Publication Data

US 2020/0127739 A1    Apr. 23, 2020

Related U.S. Application Data

(63) Continuation of application No. 16/408,256, filed on May 9, 2019, now Pat. No. 10,560,198, which is a
(Continued)

(51) Int. Cl.
| | |
|---|---|
| *H04B 10/079* | (2013.01) |
| *H04B 10/61* | (2013.01) |
| *H04B 10/67* | (2013.01) |
| *H04B 10/69* | (2013.01) |
| *H04L 27/18* | (2006.01) |

(Continued)

(52) U.S. Cl.
CPC ....... *H04B 10/614* (2013.01); *G02B 6/12007* (2013.01); *G02B 6/29347* (2013.01); *H04B 10/07953* (2013.01); *H04B 10/675* (2013.01); *H04B 10/677* (2013.01); *H04B 10/69* (2013.01); *H04B 17/20* (2015.01); *H04L 27/18* (2013.01); *H04L 27/06* (2013.01)

(58) Field of Classification Search
CPC ................................................. H04B 10/07953
See application file for complete search history.

(56) References Cited

U.S. PATENT DOCUMENTS

| | | | | |
|---|---|---|---|---|
| 2004/0033004 | A1* | 2/2004 | Welch | H04B 10/50 385/14 |
| 2005/0047780 | A1* | 3/2005 | Hoshida | H04B 10/676 398/33 |
| 2007/0047954 | A1* | 3/2007 | Mamyshev | G02F 1/2255 398/33 |

* cited by examiner

*Primary Examiner* — Nathan M Cors
(74) *Attorney, Agent, or Firm* — Richard T. Ogwa; Ogawa P.C.

(57) ABSTRACT

The present invention is directed to a communication signal tracking system comprising an optical receiver including one or more delay line interferometers (DLIs) configured to demultiplex incoming optical signals and a transimpedance amplifier configured to convert the incoming optical signals to incoming electrical signals. The communication signal tracking system further includes a control module configured to calculate a bit-error-rate (BER) of the incoming electrical signals before forward-error correction decoding, and use the BER as a parameter for optimizing settings of the one or more DLIs in one or more iterations in a control loop and generating a back-channel data.

20 Claims, 9 Drawing Sheets

Related U.S. Application Data continuation of application No. 15/633,353, filed on Jun. 26, 2017, now Pat. No. 10,333,627.

(51) Int. Cl.
    *G02B 6/12*     (2006.01)
    *G02B 6/293*    (2006.01)
    *H04B 17/20*    (2015.01)
    *H04L 27/06*    (2006.01)

RX DELAY LINE INTEFEROMETER TRACKING IN CLOSED-LOOP MODULE CONTROL FOR COMMUNICATION

CROSS-REFERENCES TO RELATED APPLICATIONS

This application is a continuation of and claims priority to U.S. application Ser. No. 16/408,256, filed May 9, 2019, which is a continuation of and claiming priority to U.S. application Ser. No. 15/633,353, filed Jun. 26, 2017, now issued as U.S. Pat. No. 10,333,627 on Jun. 25, 2019, commonly assigned and incorporated by reference herein for all purposes.

BACKGROUND OF THE INVENTION

The present invention is directed to communication systems and methods.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. To move a large amount of data, optical communication networks are often used.

With high demand for communication networks came high demand for quality networking devices. In high-speed communication systems, having optimized optical transceivers can meaningfully improve performance. For example, various parameters of optical transmitter, such as bias voltages for modulator and laser devices, can be adjusted and optimized in a communication system for improved performance.

Over the past, there have been various techniques for optimizing parameters and settings for optical transceivers. Unfortunately, existing techniques are inadequate for reasons explained below. Improved methods and systems for optimizing optical communication devices are desired.

BRIEF SUMMARY OF THE INVENTION

The present invention is directed to communication systems and methods. According to an embodiment, delay line interferometers (DLIs) in a receiver module of an optical transceiver are configured with a control loop to optimize overall bit-error-rate (BER) of communication signals against any drift. The DLI control is further coordinated with active BER-based wavelength control in a transmitter module of the optical transceiver, both being operated alternatively in time or frequency. There are other embodiments as well.

According to an embodiment, the present invention a communication signal tracking system. The communication signal tracking system includes an optical receiver comprising one or more delay line interferometers (DLIs) configured to demultiplex incoming optical signals, one or more photodetectors converting the incoming optical signals to current signals, and a transimpedance amplifier configured to convert the current signals to voltage signals. Additionally, the communication signal tracking system includes a control module configured to calculate a bit-error-rate (BER) based on the voltage signals, and use the BER as a parameter in one or more iterations for optimizing settings of the one or more DLIs in a control loop and generating a back-channel data.

According to a specific embodiment, the control module is configured to execute a search of a restart point in a two-dimensional region defined by the first bias point for the first DLI and the second bias point for the second DLI, based on a determination that the BER of the incoming electrical signals does not meet the first threshold. The search of a restart point includes starting from a last-known good point to adjust the first bias point and the second bias point by a minimum increment or decrement in a spiral path in a two-dimensional pattern up to end-of-life limits until the BER of the incoming signals meets the first threshold.

According to another embodiment, the present invention provides a communication system with signal tracking. The communication system includes a communication link, a first transceiver comprising a first control module and a first receiver, and a second transceiver comprising a second control module and a second transmitter. The second transceiver is configured to send an optical signal to the first transceiver and to receive back-channel data from the first transceiver. The first receiver is configured to receive the optical signal and convert the optical signal to an electrical signal. The first control module is configured to calculate a bit-error-rate (BER) based on the electrical signal and to execute a first iterated operation of optimizing the first receiver. The second transmitter is configured to generate the optical signal and transmit to the first receiver. The second control module is configured to execute a second iterated operation of optimizing wavelength of the optical signal. The second iterated operation is alternate in time with the first iterated operation controlled by a back-channel data transmitted from the first transceiver to the second transceiver.

According to yet another embodiment, the present invention provides a method for tracking an optical signal in receive side of a communication system. The method includes receiving an optical signal by a delay line interferometer (DLI) in a near-end receiver of a communication system. Additionally, the method includes calculating a first bit-error-rate (BER) of the optical signal. The method further includes determining the DLI to have a low signal-to-noise ratio based on that the first BER meets a threshold. Furthermore, the method includes adjusting a set point of the DLI in a first iterated operation to result in a second BER of the optical signal converged to a value smaller than the first BER. Moreover, the method includes holding the optimized set point of the DLI and transmitting the second BER in real time through a back-channel from the near-end receiver to the far-end transmitter of the communication system to adjust a transmitter setting in a second iterated operation to result in a third BER converged to a value no greater than the second BER.

It is to be appreciated that embodiments of the present invention provide many advantages over conventional techniques. Among other things, by measuring actual signal characteristics by a receiving optical transceiver of the data communication path, adjustments made by a transmitting optical transceiver improve data transmission quality better than existing techniques, where typically one-time factory settings are applied to optical transceivers. For example, adjustments such as wavelength control may be specific to the optical link and actual operating conditions (e.g., temperature, interference, etc.), which are information unavailable when optical transceivers were manufactured. In another example, on near-end receive side, the setting of the DLI may shift 2~3 mW over life or aging or other arbitrary causes, which leads poor bit-error-rate (BER) if the wavelength of the signal is held constant. A DLI control loop is able to ensure that the DLI is set at low signal-to-noise ratio state resulting in a converged small BER. The DLI loop can be alternate executed with a BER-based wavelength control loop. A spiral search approach is introduced for capturing an off-center restart point of the DLI control of using two DLIs for separately handling split TM mode and TE mode of a polarized optical signal. It is therefore advantageous for the closed loop techniques provided by the present invention to use the information and hence improved performance.

Embodiments of the present invention can be implemented in conjunction with existing systems and processes. For example, the back-channel data can be implemented to be compatible with existing communication protocols and specifically be used for the near-end receiver to communicate with far-end transmitter for conducting the DLI control loop and the BER-based wavelength control loop in a coordinated manner. Back-channel data are used by optical transceivers that are preconfigured to use them, and optical transceivers that are not configured to use the back-channel data may simply ignore them. In addition, optical transceivers according to embodiments of the present invention can be manufactured using existing manufacturing equipment and techniques. In certain implementations, existing optical transceivers can be upgraded (e.g., through firmware update) to take advantage of the present invention. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
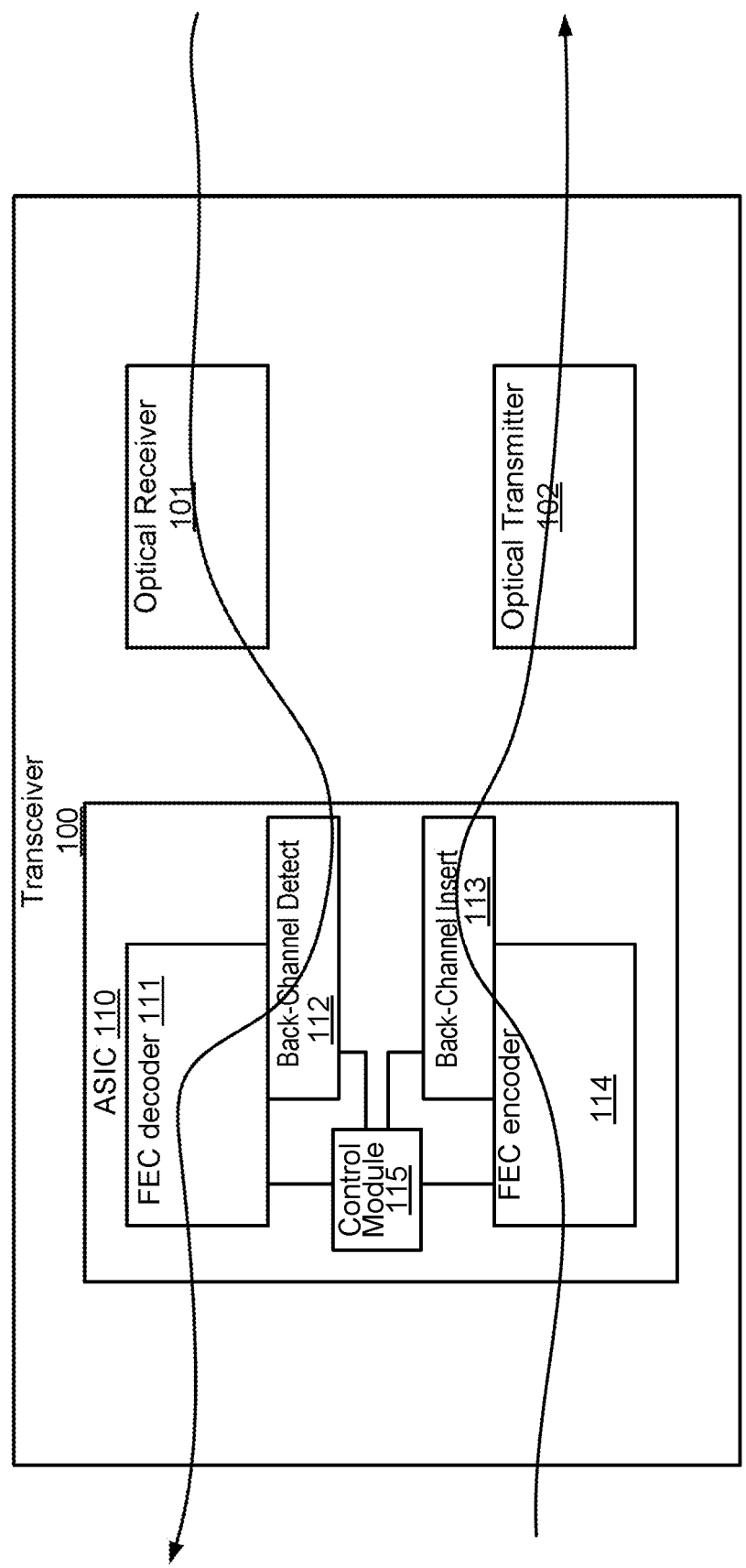
FIG. 1 is a simplified diagram illustrating optical transceiver according to an embodiment of the present invention.

The present invention is directed to communication systems and methods. According to an embodiment, delay line interferometers (DLIs) in a receiver module of an optical transceiver are configured with a control loop to optimize overall bit-error-rate (BER) of communication signals against any drift. The DLI control is further coordinated with active BER-based wavelength control in a transmitter module of the optical transceiver, both being operated alternatively in time or frequency. There are other embodiments as well.

Most optical communication modules have some form of internal control systems to maintain the optical performance. For example, typical control parameters include optical power, wavelength, extinction ratio, and/or others. However, in most cases, conventional techniques for the transmitting optical module to maintain these parameters rely on proxy measurements. For example, transmitted optical power may be measured by a tap and photodiode, or extinction ratio may be inferred from a modulator bias. Unfortunately, these conventional techniques are inadequate. A difficulty is that these proxy measurements may not represent the actual transmission characteristics, and as a result the transmitting optical path is not optimized.

In optical communication, another difficulty is that in an optical line system (including fiber optics, amplifiers, multiplexers/de-multiplexers, dispersion compensation, etc.), optimal transmission parameters may not be constant and may in fact change due to the line equipment or conditions. This may render the transmission parameters even farther from optimal.

It is to be appreciated that embodiments of the present invention provide advantages over existing techniques. More specifically, embodiments of the present invention make use of digital signal processors (DSP) and forward error correction (FEC) modules on the optical receive path. The inclusion of a DSP and FEC on the optical receive path within the module itself allows the receiving side to determine the quality of the incoming optical signal. Additionally, embodiments of the present invention provide an advanced FEC encoding that includes the ability to place additional digital information alongside the transmitted data ("back-channel"), thereby allowing the receive-side module to inform the transmitting-side module of the current signal integrity.

With DSP/FEC and advanced FEC encoding working together, a closed-loop system can be implemented, where the optical parameters of the transmit side can be tuned to optimally to reflect the current optical conditions. The tuning parameters include, but not limited to, compensating for aging or environmental effects of optical equipment from the transmitting optical module through to the receiving optical module.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating optical transceiver according to an embodiment of the present invention. This diagram is merely an example, which should not unduly limit the scope of the claims. One of ordinary skill in the art would recognize many variations, alternatives, and modifications. As shown in FIG. 1, transceiver 100 includes an optical receiver 101 that interfaces with an optical communication link and is configured to receive and process optical communication signals. In various embodiments, optical receiver includes various components, such as filter, transimpedance amplifier (TIA), fiber optic connectors, and others. Optical receiver 101 may additionally include optical transmission devices such as optical amplifiers, optical attenuators, chromatic dispersion compensation (static or tunable), lengths of fiber, patch panels and patch cables, optical multiplexers, optical de-multiplexers, etc. Among other features, optical receiver 101 converts received optical signals to electrical signals that can later be processed. The electrical signals are then processed by various digital signal processors (DSP). For example, application specific integrated circuit (ASIC) 110 includes FEC decoder 111 and a back-channel detector 112.

It is to be appreciated that once back-channel data are detected from the incoming data stream, it is determined that the source of the received optical signals is compatible with the use of back-channel data for adjusting its operating parameters. In various embodiments, the use of back-channel data is a part of a predetermined communication protocol that two or more transceivers use. If back-channel data is not detected from the received optical signals, the source of the received optical signals is not equipped to utilize back-channel data, and it would be unnecessary and even wasteful to perform signal measurements that are to be embedded into back channel data.

ASIC 110 may also include a module for measuring and analyzing signal integrity of the received signal (i.e., electrical signals converted from the received optical signals). Signal integrity may be evaluated in various signal measurements that include, but are not limited to overall signal-to-noise ratio (SNR), individual PAM-4 level SNR, overall PAM-4 histogram, optical eye diagram, and/or others. In additional to signal integrity, data error rate associated with the incoming signal may be evaluated as well. For example, FEC decoder 111 determines error rate before performing error recovery. More specifically, FEC decoder 111 has the ability to calculate a bit error ratio (BER) prior to FEC error recovery. Depending on the implementation, BER can be calculated in several different ways, such as overall BER, individual lane BER, individual PAM-4 level BER (i.e., MSB BER, LSB BER), bit-transition error matrix (e.g., in PAM-4, BER for 0->1, 0->2, 0->3 and all other level transitions), and/or other ways.

The back-channel detection module 112 is configured to detect whether the received signals include back-channel data that can be used to optimize data transmission performance. For example, the back-channel data are embedded by the source of the received signals (e.g., another optical transceiver or communication apparatus). In various embodiments, the back-channel detection module 112 is coupled to a control module 115. The control module 115 is configured to adjust various operating and transmission parameters of transceiver 100 based on the back-channel data. For example, operating parameters include temperature, bias settings, multiplexer settings, wavelength, and others, which are described below. It is to be appreciated that the back-channel detection module 112 may be implemented as a part of the closed feedback loop (e.g., between two optical transceivers). That is, data are transmitted to a second transceiver over an optical communication link. The second transceiver includes DSP and FEC module that measure the signal quality (e.g., SNR) and data quality (e.g., BER), and the measurement results are embedded in the back-channel data that are transmitted back to transceiver 100. The back-channel detection module 112 detects the existence of the back-channel data, which are used by the control module 115 to adjust operating parameters of transceiver 100. Depending on the operating condition and specific implementation, there could be iterations of processes for changing parameters, receiving back-channel data reflecting the signal quality associated with the changed parameters, and changing parameters again.

It is to be appreciated that, as explained below, back-channel data can be used to adjust not only transmitter parameters for outgoing data, but also receiver parameters for processing incoming data. For example, back channel data can be used to adjust how incoming optical signals are processed.

In various embodiments, control module 115 stores near-end parameters, which may be determined at the time when the transceiver 100 is manufactured. Control module 115 analyzes the received back-channel data, which reflects the actual conditions of data transmission, and the adjustment of operating parameters can be modifying the existing parameter based on the existing near-end parameters. In various embodiments, adjustment of operating parameters involves synchronizing and using both existing near-end data and the back-channel data that reflects conditions for actual data communication.

Transceiver 100 includes an FEC encoder 114 and a back-channel insertion module 113 as shown. For example, the FEC encoder 114 and the back-channel insertion module 113 are implemented as a part of the ASIC 110. It is to be understood that while FEC decoder 111 and FEC encoder 114 are shown as two functional blocks in FIG. 1, FEC decoder 111 and FEC encoder 114 may be implemented a single FEC module. Similarly, back-channel detection module 112 and the back-channel insertion module 113 can be implemented as single back-channel module.

FEC encoder 114 is configured to perform FEC encoding for electrical signals that are to be transmitted through the optical transmitter 102. For example, FEC encoder 114 is configured to perform different types of error correction. Back-channel insertion module 113 is configured to insert back-channel data into the outgoing data stream that is to be transmitted. As explained above, back-channel data include information regarding the quality of received data, which pertains to transmission parameters and settings of the transmitting transceiver that sends data to transceiver 100. It is to be appreciated that the back-channel insertion module is capable of inserting and/or detecting, with high fidelity, additional digital information alongside and without interfering with the transmitted data. For example, a predefined segment of outgoing data stream is used to embed the back-channel data.

In FIG. 1, a close loop technique is used for optical communication, with an optical transmitter and an optical receiver. It is to be understood that close loop techniques that use back-channel for optimizing data communication can be used in other types of communication links as well, such as existing communication lines with copper wires and/or other mediums.

Figure 2:
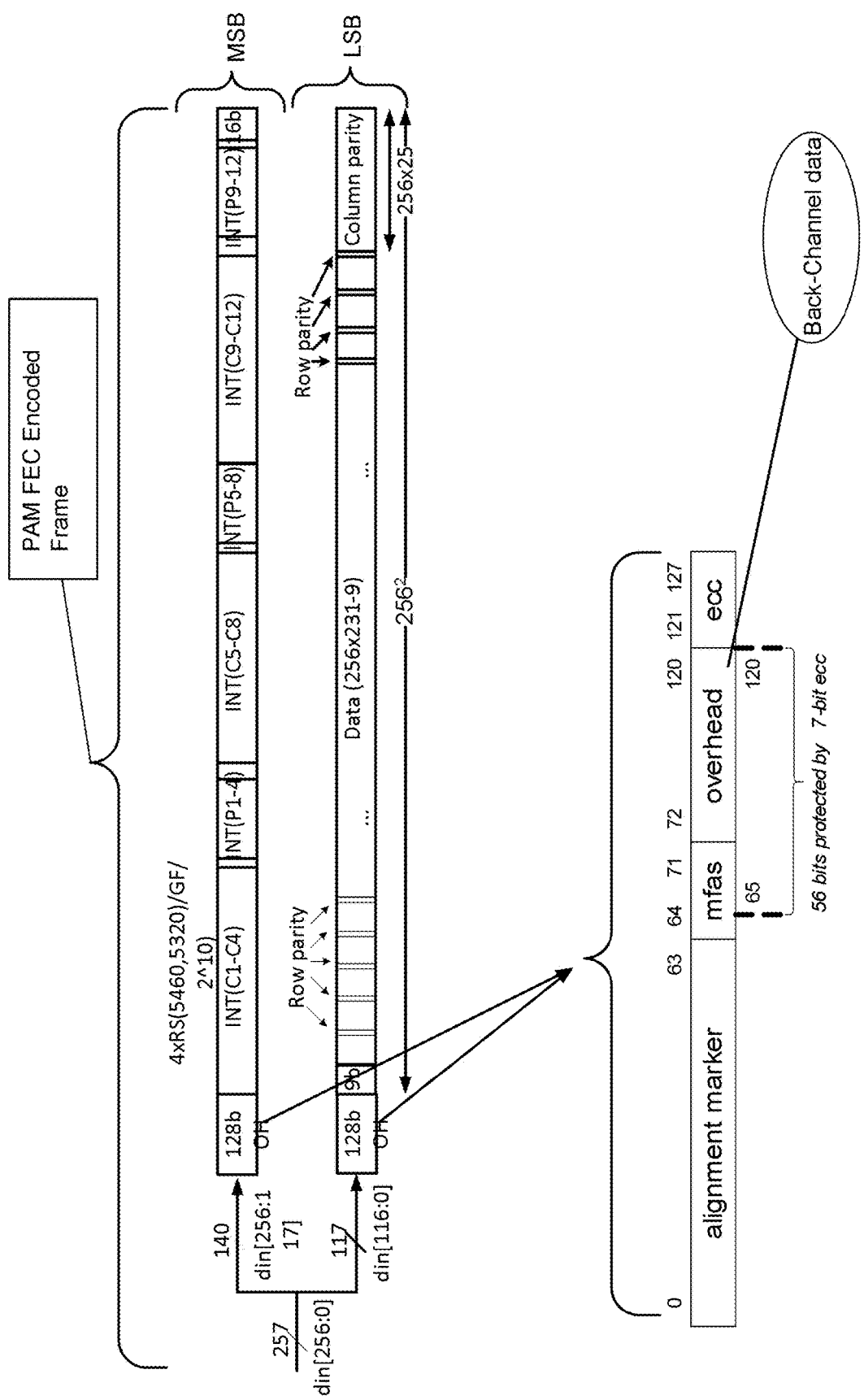
FIG. 2 is a simplified diagram illustrating an encoded data frame according to embodiments of the present invention.

FIG. 2 is a simplified diagram illustrating an encoded data frame according to embodiments of the present invention. This diagram is merely an example, which should not unduly limit the scope of the claims. One of ordinary skill in the art would recognize many variations, alternatives, and modifications. As shown in FIG. 2, an exemplary FEC encoded frame can be divided into a most significant bits (MSB) section and a least significant bits (LSB) section. Both the MSB section and the LSB section include their own respective headers. For example, the headers are 128 bits long. A header is then subdivided into alignment marker region (0-63 bits), "mfas" region (64-71 bits), overhead region (72-120 bits), and "ecc" region (121-127 bits). It is to be appreciated that overhead region stores back-channel data, which includes information related to quality (e.g., measured and/or calculated) of received signals. For example, an optical transceiver that is not equipped to take advantage of the back-channel data can simply ignore and skip over the back-channel region.

Now referring back to FIG. 1. Outgoing electrical signals are converted to optical signals and transmitted by the optical transmitter 102. For example, optical transmitter 102 includes one or more lasers devices (e.g., laser diode with cooling), one or more modulators. Additionally, optical transmitter 102 may include multiplexing and optical control blocks. Implementation and operating parameters of optical transmitter 102 usually have significant impact on signal quality and data transmission performance of the outgoing data stream. By adjusting operating parameters and settings of optical transmitter 102, signal quality and data transmission performance can be improved and optimized. While operating parameters and settings can be optimized initially at the factory, being able to adjust these parameters and settings based on actual signal measurements is better, since actual signal measurements reflect true operating conditions (e.g., fiber optic lines, interference, temperature, etc.).

According to various embodiments, the control module 115 of the transceiver 100 processes the received back-channel data, which include actual measurements of data quality as measured by a second transceiver that receives data from transceiver 100. The control module 115 then determines the optical parameters and settings accordingly. For example, operating parameters and settings may include, but not limited to, the following:

Laser temperature setting (or TEC current if directly controlled)

Laser bias current

Modulator bias setting (e.g., heater power setting if a thermo-optically controlled MZM)

Multiplexer offset bias setting (e.g., heater power setting if a thermo-optically controlled DLI)

Figure 3:
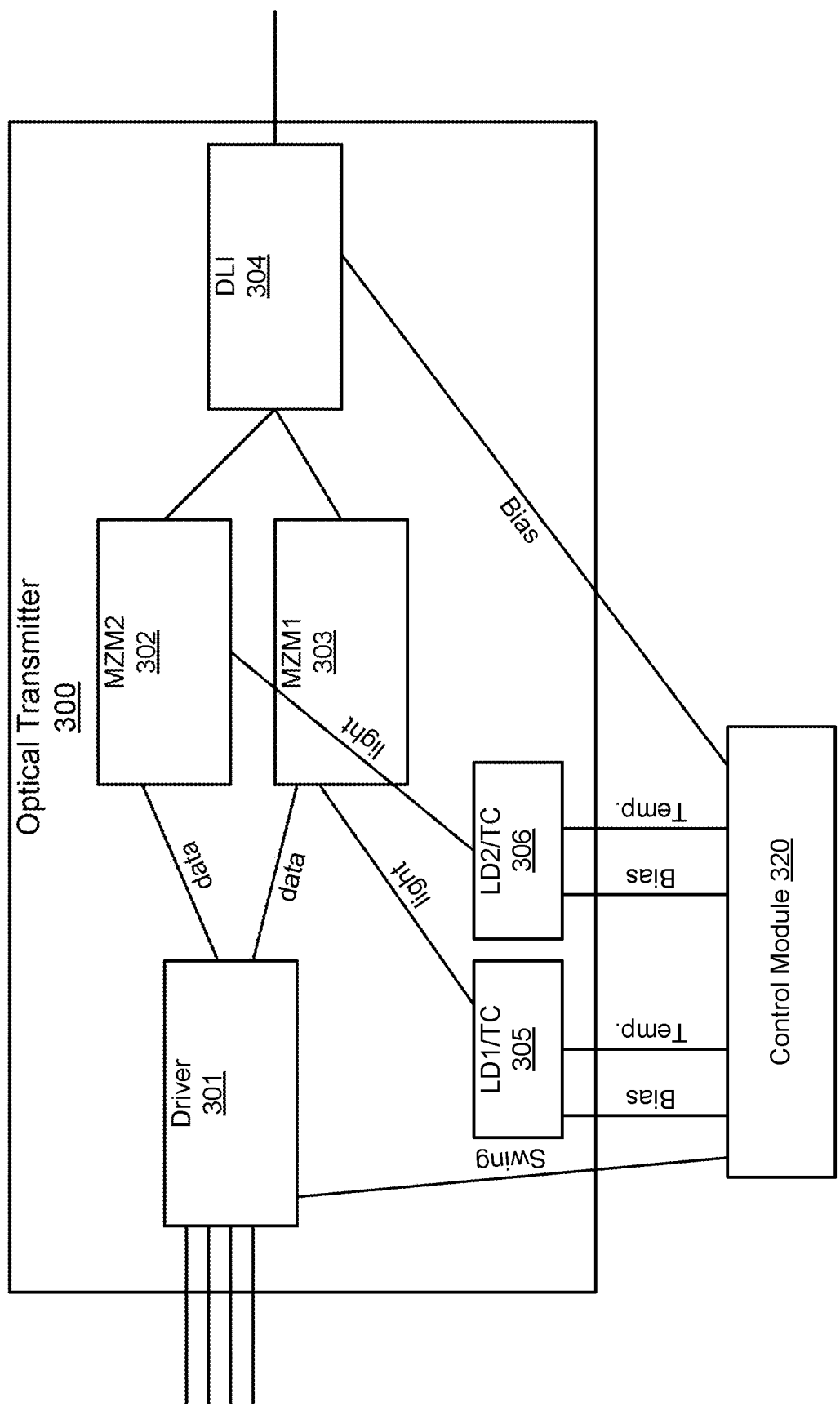
FIG. 3 is a simplified diagram illustrating an optical transmitter with back-channel data control according to embodiments of the present invention.

As an example, back-channel data provides signal quality information that can be used to adjust parameters of laser devices. More specifically, laser devices used for optical data transmission may be controlled using temperature and bias control parameters. FIG. 3 is a simplified diagram illustrating an optical transmitter with back-channel data control according to embodiments of the present invention. This diagram is merely an example, which should not unduly limit the scope of the claims. One of ordinary skill in the art would recognize many variations, alternatives, and modifications. As shown in FIG. 3, driver 301 that generates driver signal based on outgoing data can be adjusted by a voltage swing parameter. Similarly, modulators 302 and 303 may be adjusted using settings such as RF amplitude, DC bias, and/or others. For example, modulators 302 and 303 may be implemented using Mach-Zehnder modulators (MZM). Light source for optical transmitter 300 includes laser diodes 305 and 306. For example, laser diodes can be adjusted by changing laser bias and/or laser temperature. Similarly, delay line interferometer (DLI) 304, which functions as an optical multiplexer, can be adjusted with an offset bias. It is to be appreciated that the control module 320 of optical transmitter 300 can use the back-channel data to determine which parameters (as listed above) are to be adjusted. For example, the control module 320 has a control interface that provides control signals for the abovementioned parameters such as bias control, temperature control, swing voltage, and others.

According to an embodiment, back-channel data are used as a part of optical transceiver. As an example, optical receiver 101 is a part of the transceiver 100 as shown in FIG. 1, and various operating parameters of optical receiver 101 may be adjusted based on back channel data. In another example, optical transmitter 102 is a part of the transceiver 100 as shown in FIG. 1, and a transmitter setting of the optical transmitter 102 may be adjusted based alternative back-channel data. A certain signal can be formulated and utilized in the back-channel data for coordinating the controls in a near end optical receiver and a far end optical transmitter of a communication system.

Figure 4:
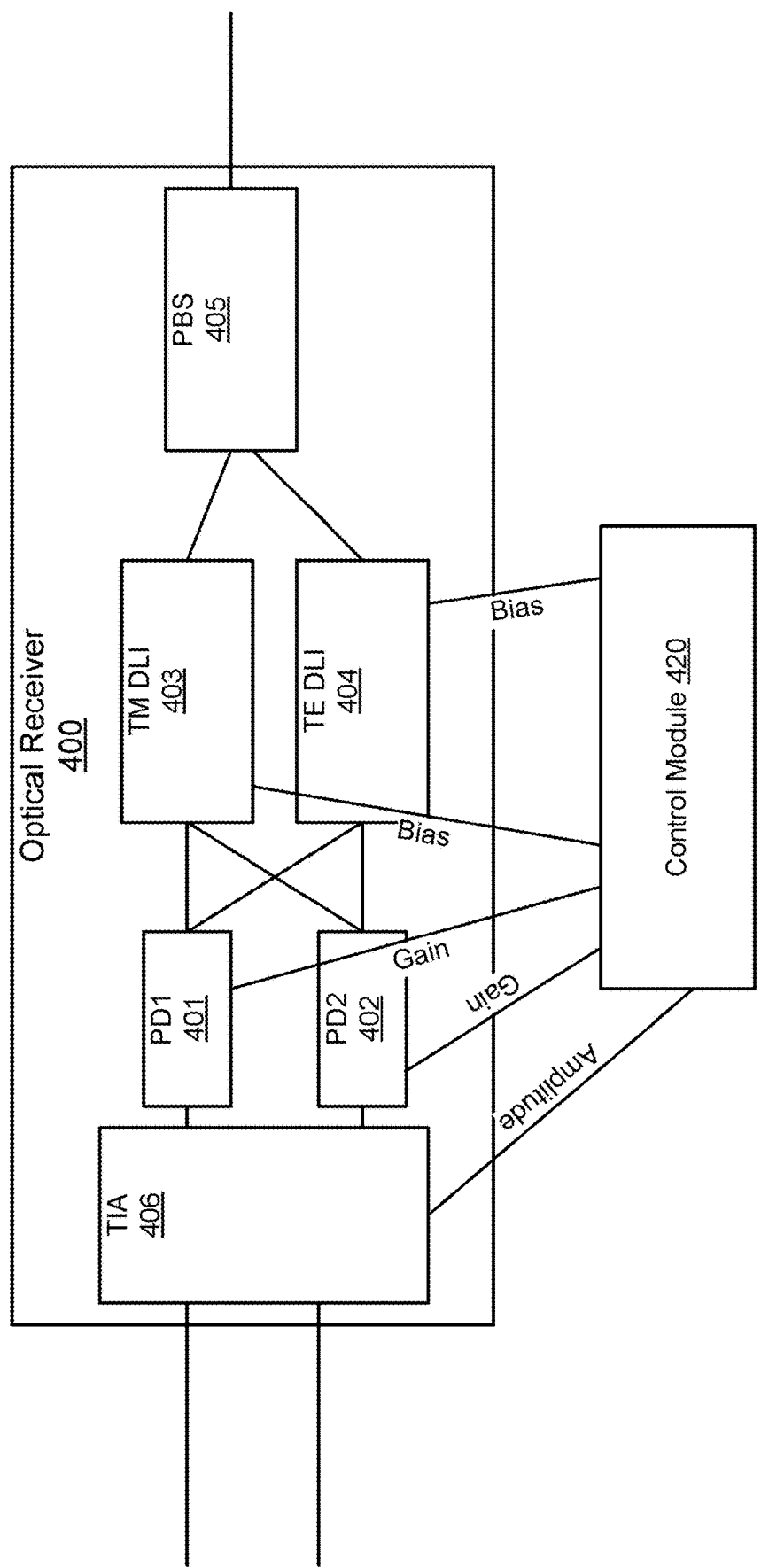
FIG. 4 is a simplified diagram illustrating an optical receiver according to an embodiment of the present invention.

FIG. 4 is a simplified diagram illustrating an optical receiver 400 according to an embodiment of the present invention. This diagram is merely an example, which should not unduly limit the scope of the claims. One of ordinary skill in the art would recognize many variations, alternatives, and modifications. Optical receiver 400 includes polarization beam splitter (PBS) 405 that splits the received optical signal for processing. The received optical signal is then processed by optical multiplexers 403 and 404. For example, multiplexers 403 and 404 comprise DLI devices that can be adjusted using bias settings. For thermal-optically controlled DLIs, heater power settings may be used to adjust DLI operations. Multiplexers 403 and 404 are coupled to photodetectors 401 and 402, which respectively convert incoming optical signals that demuxed by the DLI devices to current signals. The current gain settings of the photodetectors 401 and 402 can be adjusted. For example, photodetectors may be amplified, and thus gain settings are needed. For example, avalanche photodiodes can be adjusted by changing its photocurrent gain. The outputs of photodetectors 401 and 402 are coupled to TIA 406, which generates voltage signals based on the current signals converted from the received optical signals. Depending on the implementation, various parameters such as amplitude, gain, and/or bandwidth, can be adjusted based on back-channel data. As mentioned above, a control module 420 may be used to process received back-channel data and generates control signals to adjust these parameters.

To make use of back-channel data and to generate control signals for changing operating parameters, a control module can be used. For example, abovementioned control modules 420 may be implemented as a part of a computer engine block, or a microcomputer that is a part of optical transceiver ASIC. To use the transceiver 100 as an example, the control module is configured with the back-channel insertion module 113 to insert digital signals alongside the transmitted optical data, which describe the integrity of the received optical signal (as measured by DSP and/or FEC modules). Additionally, the control module is able to use the back-channel detector 112 to detect back-channel data embedded in the received signals. Once detected, the control module processes the back-channel data and generates control signals accordingly. The control signals are used to adjust various operating parameters of the transceiver (e.g., optical receiver, optical transmitter, etc.). Additionally, operating conditions of the optical transceiver may change (e.g., interference, optical line quality, temperature change, etc.). By using back-channel data, the control module adjusts and optimizes transceiver performance accordingly. Since the back-channel data are shared between two or more transceivers, two transceivers form a feedback loop for optimizing data transmission over a communication link.

In an exemplary embodiment, back-channel data are used to adjust, among other parameters, transmitting wavelength. In a DWDM system, for example, the transmitting wavelength is an important parameter. In certain implementations, transmitting wavelength can be controlled via carefully tuning the temperature of a thermally tuned laser. However, the actual frequency may not match the measured temperature of the laser. More specifically, temperature and wavelength for the same laser device may change over time as a part of laser device aging process. As a result, the thermal gradient of a laser device at the beginning of life calibrations, typically due to aging, becomes inaccurate over an extended period of time. Furthermore, since laser devices generate heat, depending on the packaging and/or placement of the laser device, adjusting laser devices in actual operating condition. For example, thermal gradients are involved with either self-heating or environmental temperature interference.

In various embodiments, the control module is positioned on the data transmission path. For example, the wavelength of the light is measured using Fabry-Pérot interferometer (or etalon) type of device. It is to be appreciated that even small changes in frequency and/or wavelength can have significant impact on the signal integrity of the transmitted data. For example, in various embodiments of the present invention, characteristics of the received signal (e.g., SNR, BER, Eye-Level parameters, etc.) are passed from a receiving optical transceiver back to the transmitting optical transceiver. The transmitting optical transceiver then adjusts the frequency of its one or more lasers and waits for confirmation of whether an improvement has been made, or the signal has gotten worse, thereby forming a closed feedback loop for optimizing signal transmission. The transmitting optical transceiver can try many frequencies (in the right direction) to obtain optimal frequencies of the one or more lasers.

Below is a simplified process for adjusting optical transceivers according to embodiments of the present invention, the process including the following steps:

1. At the receiver, measure a bit-error rate BER ("b11") corresponding to conditions at transmitter temperature setting 1 ("t1") and transmitter temperature setting 2 ("t2"), and the receiver uses a predefined back-channel to transmit data back to the transmitting module;
2. At the transmitting module, modify transmission parameter with step t1 by an amount approximately equal to 0.5 GHz;
3. At the receiving module, measure BER ("b21") and use the back channel to transmit back to the transmitting module;
4. At the transmitting module, modify transmission parameter with step t2 by an amount approximately equal to 0.5 GHz;
5. At the receiving module, measure BER ("b12") and use the back channel to transmit back to the transmitting module;
6. At the transmitting module, calculate values d1 and d2 (which are changes to be made to temperature t1 and t2) with the following equations (g is a gain setting for the transmitting module):

$$d1 = g \times (1 - b21/b11) \qquad \text{a.}$$

$$d2 = g \times (1 - b12/b11) \qquad \text{b.}$$

7. At the transmitting module, adjust t1->t1+d1 and t2->t2+d2; and
8. Repeat from step 1 as needed, until an acceptable BER is obtained at the new t1 and t2 settings.

It is to be noted that steps 1-3 and 4-5 are performed in a changing order to remove unrelated monotonic effects from the system.

It is to be appreciated the back-channel data can also be used to provide modulator bias control. Among other things, the bias point of the modulator needs to be maintained at the proper value to provide an optimized extinction ratio. In some cases, the optimal bias point is not at quadrature but rather at a point off-quadrature. Often, a fixed bias point is used, which based on for worst-case line system conditions. In various embodiments, characteristics of the received signal (including SNR, BER, Eye-Level parameters, etc.) are measured by the receiving module, embedded into back-channel data, and to the transmitting module. The transmitting module adjusts the modulator bias point based on the back-channel data, and waits for indication (embedded in the back-channel data) from the receiving module as a feedback for the next iteration of adjustment. In this way, the transmitting module can continuously seek the optimal modulator bias point until a predetermined threshold performance level is obtained.

The back-channel data in closed feedback loop can also be used for adjusting multiplexer bias settings. For example, in a silicon photonics based multi-wavelength module design, a delay line interferometer (DLI) may be used to multiplex two optical wavelengths onto the same transmitting optical fiber. To optimize performance, center frequency of the DLI needs to be carefully controlled to optimally pass or separate both wavelengths.

In an exemplary embodiment, the characteristics of the received signal (e.g., SNR, BER, Eye-Level parameters, etc.) from a transmitting module are measured by a receiving module, which inserts the signal characteristic information into back-channel data. The back-channel data is then transmitted to the transmitting module, along with other data. The back-channel data is then processed by the transmitting module. The transmitting module adjusts the DLI center frequency based on the signal characteristics provided in the back-channel data, and transmits data to the receiving module with new DLI bias setting, and waits for signal characteristics information from the receiving module. The feedback loop between the transmitting module and the receiving module operates a number of iterations until certain predetermined conditions are met. For example, predetermined conditions may include a predetermined number of iterations, the total amount of adjustment/calibration time, and/or predetermined signal characteristics.

In certain embodiments, near-end tuning (e.g., in combination with bias setting) of DLIs are adjusted using the closed-loop back channel data.

Additional parameters and settings of optical transceivers can be adjusted using back-channel data. For example, characteristics of the received signal (e.g., SNR, BER, Eye-Level parameters, etc.) are measured by a receiving module and inserted to the back-channel data as a part of the closed feedback loop. The transmitting module then uses the back-channel data to adjust its operating parameters and settings, which include, but not limited, the following:

Modulator swing (RF amplitude);
Laser bias (i.e., Automatic Power Control);
PAM-4 level optimization (in this case the histogram calculated by the receiver can be used to optimize the level amplitude settings);
PAM-4 MSB/LSB lane skew; and/or
Relative transmitted power among one or more lasers sharing the same optical fiber.

For example, by adjusting relative transmitted power among one or more lasers, optical SNR (OSNR) within a channel group can be adjusted to optimize the overall BER. For example, in a 2-channel 100G system, the launch power and OSNR can be optimized for 100G BER and still keep the total transmitted optical power (CH1+CH2 power) constant.

In certain embodiments, in addition to using the back-channel to transmit data from the receiving module to the transmitting module, the SNR and BER can be used to optimize near-end parameters, which includes but not limited to:

TIA output amplitude, gain or bandwidth control;
Photodiode gain (e.g., in an APD); and/or
Receiver de-multiplexer center frequency control (i.e., for a silicon photonics DLI demultiplexer).

In various implementations, two or more parameters of an optical transceiver may be adjusted, and when doing so, priority or preference may be given to parameters such as far end TX wavelength tuning over near end RX DLI tuning. For certain parameters, such as far end transmission MSB/LSB and far PAM 4 swing settings, it may be advantageous to perform optimization in parallel.

The optical receiver the communication system based on silicon photonics also uses a delay line interferometer (DLI) as a demuliplexer to demultiplex an incoming optical signal with two wavelengths from one optical fiber and split to two separate detectors. The set point of the DLI controls the splitting of the incoming optical signal. While in various implementations, the DLI may be drifted over time so that its set point could be far off center and even out of a threshold (region) to lock the DLI at a low signal-to-noise ratio state. Referring to FIG. 4, the optical receiver 400, which may be disposed in a receive side Transceiver of a communication system, includes a polarization beam splitter (PBS) 405 to receive a polarized optical signal. PBS 405 splits the optical signal to a first part having a Transverse Magnetic (TM) mode received by a first DLI 403 in TM mode and a second part having a Transverse Electric (TE) mode received by a second DLI 404 in TE mode. Each of the DLIs 403 and 404 is used as a demultiplexer to split one beam (either in TM or TE mode) to two beams respectively detected by photodiodes PD1 401 and PD2 402 which work together with a TIA module 406 to convert the optical signals to electrical current signals. Through the above optical path for the TM mode and TE mode, a set point of the DLI that controls a heating power of a heater associated with the DLI needs to be adjusted properly to achieve a desired phase delay to cause a demultiplexing of the polarized optical signal with high extinction ratio. In case there is a shift of the set point of at least one of the two DLIs, the phase delay is changed accordingly which causes false mixing of different wavelength or polarization mode and introduces noises or errors into the electrical signals generated by the TIA module.

Figure 5:
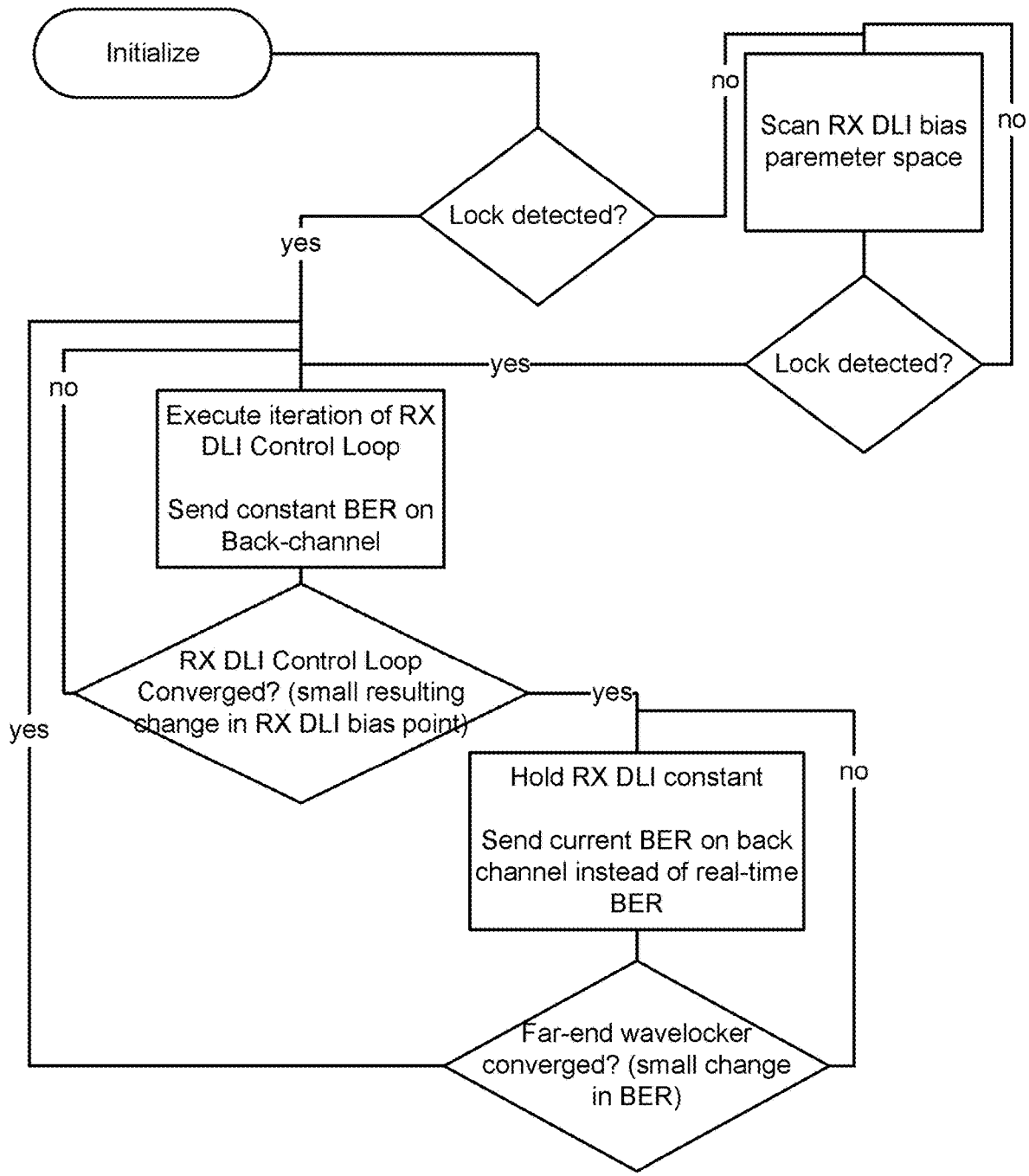
FIG. 5 is a simplified flow chart illustrating a method of optimizing communication signal in receive side according to an embodiment of the present invention.

In an embodiment, a receiver DLI (Rx DLI) control loop structure is proposed, as shown in FIG. 4, to use a control module 420 to couple with the one or more DLIs 403 and 404 and a method of executing the Rx DLI control loop is implemented for tracking the incoming optical signals from the receive side of the communication system. FIG. 5 is a flow chart illustrating a method of optimizing communication signal in receive side according to an embodiment of the present invention. This diagram is merely an example, which should not unduly limit the scope of the claims. One of ordinary skill in the art would recognize many variations, alternatives, and modifications. As shown in FIG. 5, the method is initiated with a step of checking if the DLIs associated with the optical receiver is locked in a low signal-to-noise ratio (SNR) state. In this step, the control module 420 is configured to calculate a first bit-error-rate (BER) of an incoming electrical signal converted from an incoming optical signal received by the DLIs before being decoded by a FEC module. The control module 420 is also configured to compare the first BER to a threshold. For example, a threshold BER of 1e-3 is selected. If the first BER is smaller than the threshold, the DLIs is considered to be locked in the low SNR state, but further optimization of the BER is needed for overcoming possible set point shift over time or aging or any other reasons.

In an embodiment, after determining the DLIs to be a low SNR state, the method includes a step of starting a first iterated operation executed in a Rx DLI control loop for optimizing a set point of each DLI in the near end receiver using the BER as a control parameter. In a specific embodiment, the set point of a DLI is a bias point for controlling heating power for operating a heater associated with at least one arm of the DLI for tuning its phase delay by changing temperature to achieve desired interference spectrum for demuxing the optical signal. Referring to FIG. 5, the iterated operation is performed in the Rx DLI control loop to adjust the set point in multiple iterations until it is satisfied under a convergence criterion. For example, the convergence criterion can be satisfied with a small resulting change of the set point of the DLI, which indicates the set point is substantially optimized to yield a second BER that is desirably smaller than the first BER and substantially converged to keep the DLI at the low SNR state.

In another embodiment, the Rx DLI control loop can be used to catch an off-center restart point. Referring to FIG. 5, in case the first BER is determined in the first step to be greater than the threshold, the Rx DLI is not locked in a low SNR state. This occurs at least in two scenarios: 1) the set point of Rx DLI has drifted too far from a nominal set point or 2) the wavelength of the optical signal has drifted too much away from a target wavelength set for a far-end transmitter in the communication system where the incoming optical signal is generated. For the scenario 1) with off-centered DLI setting, the method proposed in the flow chart of FIG. 5 includes searching of the Rx DLI parameter space to catch an off-center restart set point. Optionally, the Rx DLI includes one TM_DLI for handing TM-mode signal and one TE_DLI for handling TE-mode signal. The set point includes a first bias point for controlling the TM_DLI and a second bias point for controlling the TE_DLI, both contributing the overall BER finally after the TM-mode and TE mode optical signal are combined and converted to an electrical signal. Then, the searching of the Rx DLI parameter space is a two-dimensional search with respective up-down movement in two directions of the first bias point and the second bias point. Of course, if the set point involves more parameters, the searching includes all combined up-down movements of all parameters.

Figure 9:
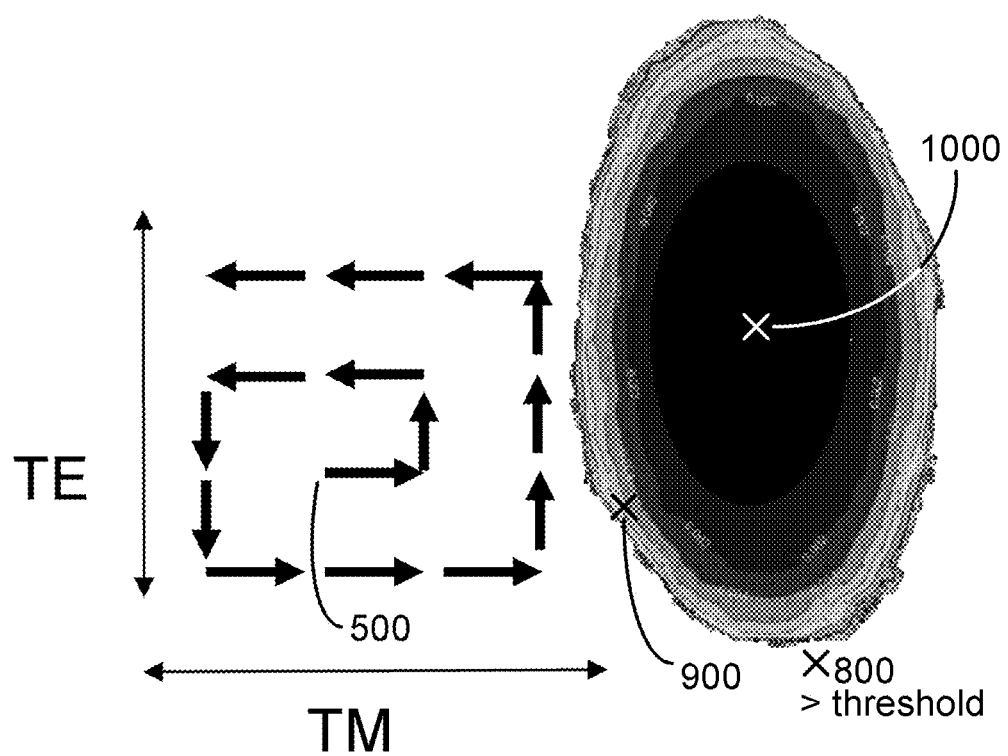
FIG. 9 a schematic diagram of spiral search of an off-center restart point in a two-dimensional parameter space according to a specific embodiment of the present invention.

FIG. 9 shows an example of a two-dimensional search for finding an off-center restart point in a type of spiral search. The circled region to the right side of the figure represents a contour map of the BER values in the plane of two bias points for TM-mode and TE-mode control, within which the BER values are smaller than a threshold, i.e., locked region. The darker in the circled region is toward a central region 1000, the smaller the BER value is. All plane area outside the circled region, e.g., region 800, represents an un-locked region with the BER values greater than the threshold. Since the set point has drifted too far, the beginning point 500 is found at outside the circled region. Starting from the beginning point 500 (or firstly shifted to a last-known good point), the spiral search includes multiple search sub-steps to make a serial movements in both a TM direction and a TE direction in a spiral pattern. The search loop continues each search sub-step followed by a lock-detection step up to end-of-life limits and may eventually end with finding a restart point 900 inside the circled region. The restart point 900 may still be an off-center point but can be used to start the first iterated operation in the Rx DLI control loop (FIG. 5) and drive the set point towards the central point 1000 as the control parameter BER converges.

For the scenario 2) with off-target wavelength drift in the optical signal originally generated from a far end transmitter of the communication system, Referring to FIGS. 1-4, the Rx DLI control loop in the near end receiver 400 can communicate with the far end transmitter 300 by taking advantage of the back channel data insertion and detection function in the transceivers 100 at both the near end and the far end of the communication system. Optionally, at the beginning of executing the first iterated operation of Rx DLI control loop, the control module of the near end receiver is configured to send a constant BER on the back channel. The transmitter 300 at the far end is able to detect the constant BER in the back-channel data and use it as a control signal for a control module 320 to stop any wavelength adjustment so that the optical signal generated by the far end transmitter is held at a stable condition as the near end receiver is tracking the Rx DLI set point. Optionally, at the end of the iterated operation as the second BER converges the control module of the near end receiver is also configured to hold the set point of DLI at the last adjusted or optimized constant to keep the near end receiver in working and send a real-time BER on the back channel. The far end transmitter 300 is also able to detect the real-time BER in the back-channel data and use it as a control signal for the control module 320 to initiate a second iterated operation for tracking the wavelength of the optical signal. Since the optical signal generated by the far end transmitter 300 is actually the incoming optical signal received by the near end receiver 400, the second iterated operation optionally still uses the BER calculated by the control module 420 at the near end receiver 400 as a control parameter to determine if the second iterated operation is converged based on detection that the BER is converged to a third BER that is no greater than the second BER. Referring to FIG. 5, the second iterated operation is coordinately performed with the first iterated operation through back-channel data communication.

It is to be appreciated that different types of algorithms may be implemented to take advantage of the feedback mechanisms involving back-channel data. For example, a transmitting transceiver keeps adjusting its operating parameters based on the measured signal characteristics provided by the receiving transceiver until performance level in terms of a bit-error-rate threshold is obtained. In certain implementation, optical transceivers perform quality continuously and as long as they operate. There are other implementations as well.

Figure 6:
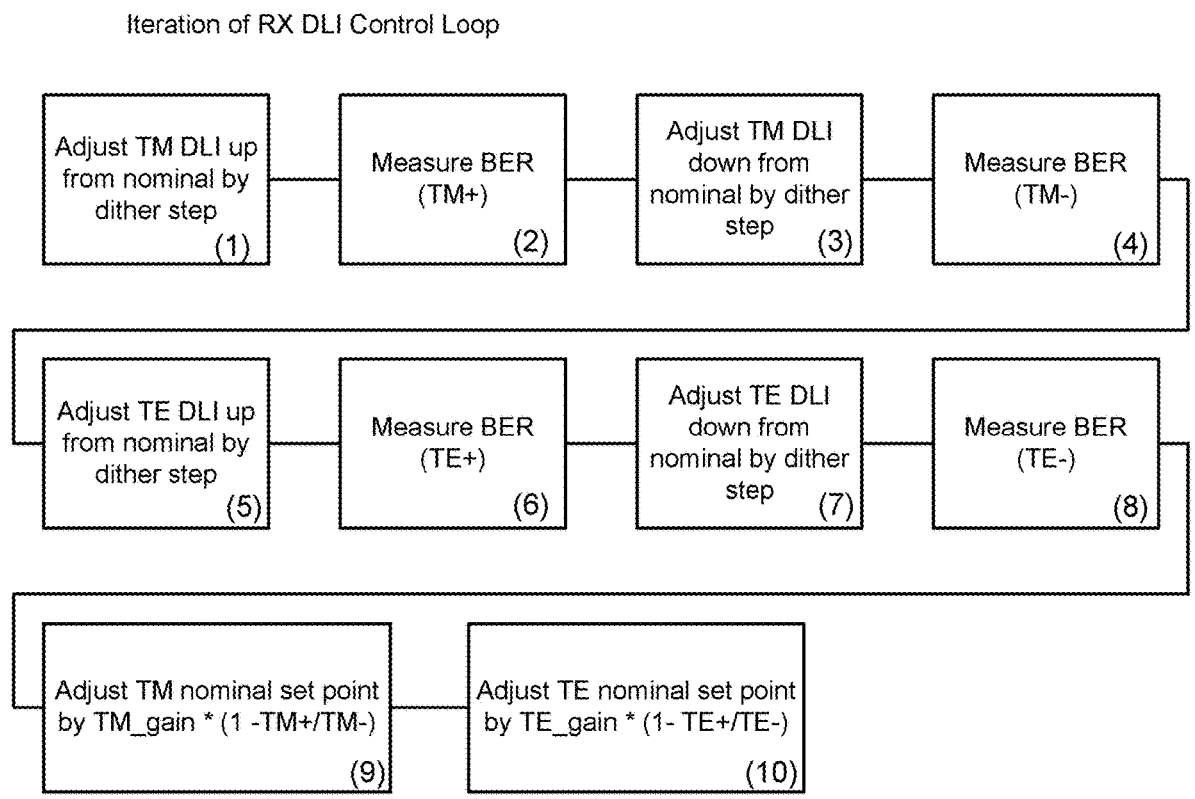
FIG. 6 is a simplified flow chart illustrating a control method of tracking delay line interferometer (DLI) in receiver module according to an embodiment of the present invention.

In a specific embodiment, the first iterated operation of the Rx DLI control loop is executed in a gradient descent search of an optimized set point of the DLI using the BER as a proportional integral derivative parameter. FIG. 6 is a simplified flow chart illustrating a control method of tracking the set point of DLI in the near end receiver according to an embodiment of the present invention. This diagram is merely an example, which should not unduly limit the scope of the claims. One of ordinary skill in the art would recognize many variations, alternatives, and modifications. As shown in FIG. 6, an iteration of the loop employs a dithering and adjusting process to adjust DLI bias point based on the BER as it responds to both up and down dithers of the bias point. Assuming that the near end receiver (see FIG. 4) has a TM_DLI for demuxing the TM-mode signal and a TE_DLI for demuxing the TE-mode signal of a same incoming optical signal, the dithering and adjusting process includes operations for dithering and adjusting two independent bias points: a TM bias point and a TE bias point.

Referring to FIG. 6, the iteration includes (1) adjust the TM bias point up from a nominal set point in one dither step, for example, the TM bias point is adjusted to change heating power of 0.25 mW to achieve a phase change of 3 degrees up for the DLI; (2) measure the BER at this currently dithered point to obtain a BER(TM+) value; (3) adjust the TM bias point down from the nominal set point in another dither step, for example, the TM bias point is adjusted to change heating power of 0.25 mW to achieve a phase change of −3 degrees down for the DLI; (4) measure the BER at the current dithered point to obtain a BER(TM−) value; (5)-(8)

repeat the steps of (1)-(4) for dithering the TE bias point and measuring corresponding BER values, BER(TE+) and BER(TE−); (9) adjust the TM nominal set point by adding TM_gain×[1−BER(TM+)/BER(TM−)]; (10) adjust the TE nominal set point by adding TE_gain×[1−BER(TE+)/BER(TE−)]; and measuring the overall BER at the adjusted bias points, based on which a determination on whether the Rx DLI control loop is converged or not is checked. Note, the sequential number used here does not limit an actual implementation order of each dither step. For example, steps (3) and (4) may be performed before steps (1) and (2), steps (5)-(8) may be performed before steps (1)-(4). In another example, steps (1)-(2) and steps (3)-(4) are performed in a changing order and steps to remove unrelated monotonic effects from the system. Similarly, steps (5)-(6) and steps (7)-(8) are performed in a changing order and steps to remove unrelated monotonic effects from the system. It is to be appreciated that dithering and adjusting for TM_DLI and dithering and adjusting for TE_DLI can be alternately performed to obtain an overall BER in every iteration of the first iterated operation towards convergence, although other variations are still possible.

In some embodiments, the first iterated operation is performed until a first convergence criterion is reached. Optionally, the first convergence criterion is defined by a limited recent average movement of a set point of the DLI in recent iterations of the first iterated operation. In other words, referring to FIG. 9, the set point is substantially close to the target point 1000 such that the BER value for any dither-up step and dither-down step is substantially the same. Optionally, the first convergence criterion can be defined as a limited change of the BER over recent iterations of the first iterated operation. In other words, a difference of the BERs obtained between two consecutive iterations of recent iterations is substantially the same. Optionally, the first convergence criterion can be defined as a fixed number of dither steps for increasing or decreasing delay-phases of the DLI around a nominal set point over recent iterations of the first iterated operation. The fixed number is merely a predetermined number of iterations expecting that an exponential convergence to target point can be reached under the proportional integral derivative loop regardless of how far off the start point was.

Figure 7:
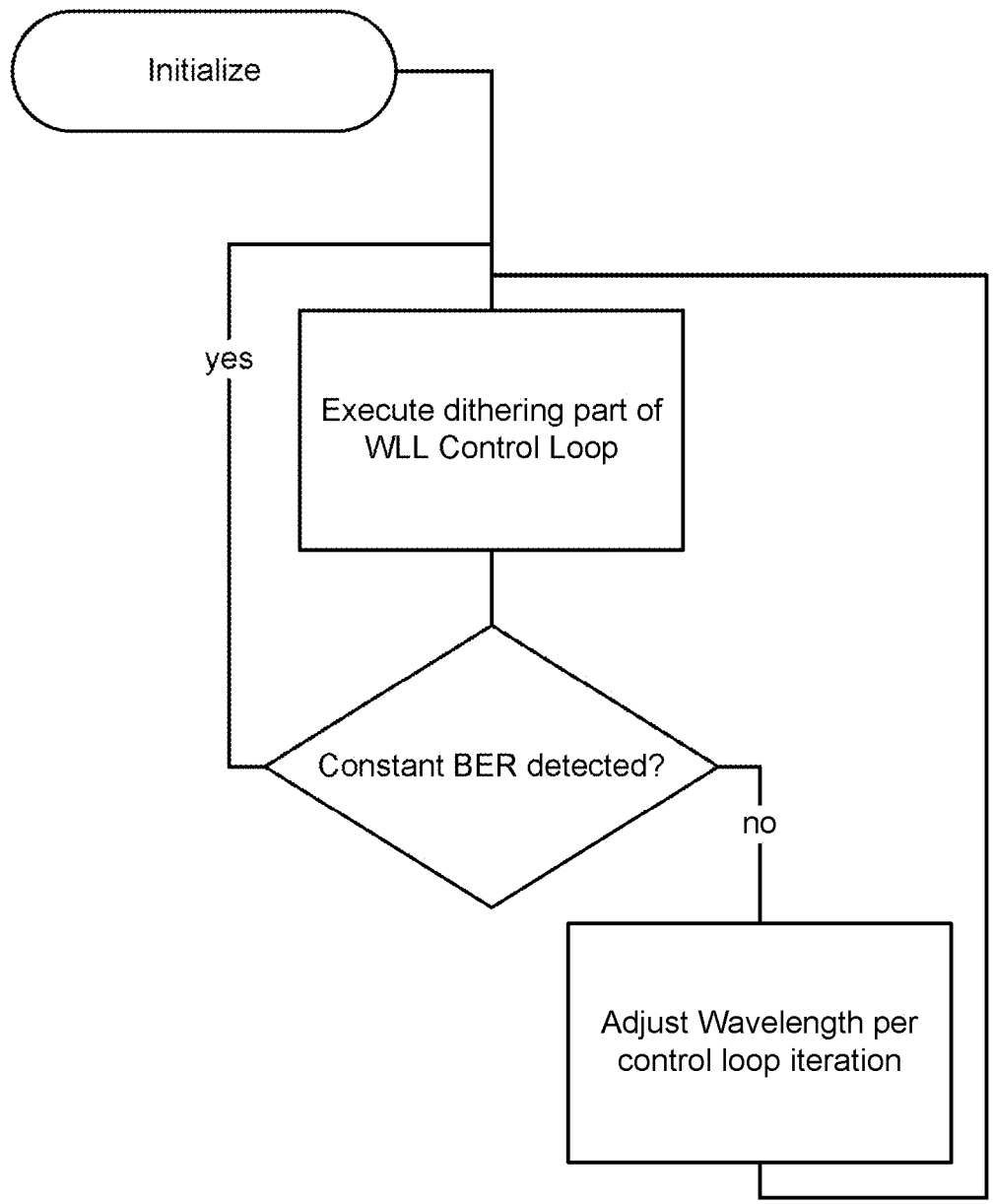
FIG. 7 is a simplified flow chart illustrating a method of optimizing communication signal in transmit side in a coordinated control according to an embodiment of the present invention.

In another specific embodiment, the second iterated operation is executed in a gradient descent search of an optimized setting of the far end transmitter using the BER measured at the near end receiver as a proportional integral derivative parameter. FIG. 7 is a flow chart illustrating a method of optimizing communication signal in transmit side in a coordinated control according to an embodiment of the present invention. This diagram is merely an example, which should not unduly limit the scope of the claims. One of ordinary skill in the art would recognize many variations, alternatives, and modifications. As shown in FIG. 7, the method of optimizing communication signal in transmit side only starts once the BER is optimized in receive side (see FIG. 5). If a constant BER is detected in back-channel data by the control module 320 of the far end transmitter 300 (see FIG. 3), the control module 320 only execute dithering a transmitter setting without adjusting transmission frequency in the transmitter wavelength control loop. The second iterated operation of optimizing communication signal is actually started when a constant BER is not detected but a real-time BER is detected in the back-channel data indicating the active BER has been optimized as the Rx DLI control loop ended with a converged second BER (assuming that the Rx DLI control is started with a first BER). This time, the control module 320 executes both dithering and adjusting the transmission frequency in each dither step and adjust nominal transmitter setting to adjust wavelength of the optical signal. The second iterated operation still use the BER at the receive side as a control parameter to determine if the BER is converged (see FIG. 5) at a third BER having a value no greater than the second BER based on a second convergence criterion.

In some embodiments, the second iterated operation is performed until the second convergence criterion is reached. Optionally, the second convergence criterion is defined by a limited change of the BER over recent iterations of the second iterated operation. In other words, a difference of the BERs obtained between two consecutive iterations of over recent iterations is substantially the same. Optionally, the second convergence criterion comprises a fixed number of dither steps for increasing or decreasing transmission frequency around a nominal set point of the far end transmitter over recent iterations of the second iterated operation. The fixed number is merely a predetermined number of iterations expecting that an exponential convergence to target point can be reached under the proportional integral derivative loop regardless of how far off the start point was. Optionally, the second convergence criterion comprises a limited recent average movement of a set point of the far end transmitter in recent iterations of the second iterated operation. In other words, referring to FIG. 9, the set point is substantially close to the target point 1000 such that the BER value for any dither-up step and dither-down step is substantially the same.

In another aspect, the present invention provides a communication system with signal tracking. The system includes a communication link, a first transceiver comprising a first control module and a first receiver, and a second transceiver comprising a second control module and a second transmitter. The second transceiver is disposed at far end of the communication system configured to send an optical signal to the first transceiver disposed at near end of the communication system. The second transceiver is also configured to receive back-channel data from the first transceiver. In some embodiments, the first receiver is configured to receive the optical signal generated by the second transmitter and convert the optical signal to an electrical signal. In some embodiments, the first control module is configured to calculate a bit-error-rate (BER) based on the electrical signal and to execute a first iterated operation of optimizing the first receiver until the BER converges. In some embodiments, the second transmitter is configured to transmit the optical signal to the first receiver with wavelength locking. In some embodiments, the second control module is configured to execute a second iterated operation of optimizing wavelength of the optical signal. The second iterated operation is alternate in time with the first iterated operation coordinately controlled by a back-channel data transmitted from the first transceiver to the second transceiver.

Figure 8:
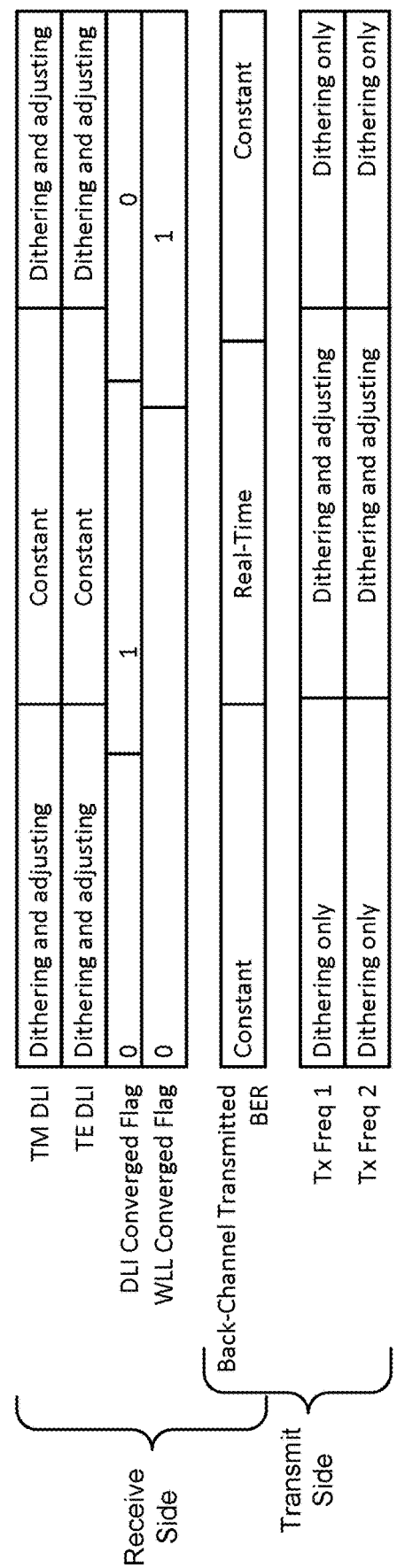
FIG. 8 is a simplified diagram illustrating a coordinated control for tracking optical signals alternately with a near-end DLI control and far-end transmitter control in a communication system according to an embodiment of the present invention.

FIG. 8 is a simplified diagram illustrating a coordinated control for tracking optical signals alternately with a near-end DLI control and far-end transmitter control in a communication system according to an embodiment of the present invention. This diagram is merely an example, which should not unduly limit the scope of the claims. One of ordinary skill in the art would recognize many variations, alternatives, and modifications. As shown in FIG. 8, in a communication system including a receive side transceiver and a transmit side transceiver communicated to each other via a communication link, both Rx DLI control at receive side and active BER-based wavelength control at transmit side are needed for tracking optical signals sent from a far end transmitter to a near end receiver. Optionally, the tracking optical signal at the receive side can be operated in a coordinated manner by alternately performing a receive side Rx DLI control and a transmit side wavelength control controlled by a back channel data inserted by the near end receiver and detected by the far end transmitter.

Referring to FIG. 8, as an example, the receive side Rx DLI control includes alternate first stage of dithering and adjusting both set points for TM_DLI and TE_DLI and second stage of keeping set points constant. Accordingly, a constant BER is transmitted in back-channel during the first stage while a real-time BER is transmitted during the second stage. Again in this example, the transmit side wavelength control includes alternate third stage of dithering transmission frequency only and fourth stage of dithering and adjusting transmission frequency. In a coordinated manner, the third stage of the transmit side wavelength control is executed whenever a constant BER is detected in the back-channel data, which corresponds to the first stage of the receive side Rx DLI control. The fourth stage of the transmit side wavelength control is executed whenever a real-time BER is detected in the back-channel data, which corresponds to the second stage of the receive side Rx DLI control.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication system with signal tracking, the communication system comprising:
   a communication link;
   a first transceiver comprising a first control module and a first receiver;
   a second transceiver comprising a second control module and a second transmitter, the second transceiver being configured, via the communication link, to send an optical signal to the first transceiver and receive back-channel data from the first transceiver;
   wherein:
   the first receiver is configured to receive the optical signal and convert the optical signal to an electrical signal;
   the first control module is configured to calculate a bit-error-rate (BER) based on the electrical signal, to execute a first iterated operation of optimizing the first receiver;
   the second transmitter is configured to generate the optical signal and transmit to the first receiver;
   the second control module is configured to execute a second iterated operation of optimizing wavelength of the optical signal, the second iterated operation being alternate in time with the first iterated operation controlled by a back-channel data transmitted from the first transceiver to the second transceiver;
   the first control module is configured to couple with at least a delay line interferometer (DLI) in the first receiver and to execute the first iterated operation using the BER as a control parameter in response of dithering and adjusting a set point of the DLI;
   wherein the communication link comprises an optical fiber.

2. The communication system of claim 1 wherein the first control module is configured to execute a search of a restart point in a two-dimensional region defined by a first bias point for the DLI.

3. The communication system of claim 1 wherein the second control module is configured to couple with the second transmitter and to execute the second iterated operation using the BER as a control parameter in response of dithering and adjusting a transmission frequency, wherein the first iterated operation and the second iterated operation are executed alternate in time.

4. The communication system of claim 1 wherein the first control module is configured to transmit a constant BER in the back-channel data during the first iterated operation until a first convergence criterion for the DLI is satisfied, and to hold a set point of the DLI that is adjusted in a last iteration of the first iterated operation and transmit a real-time variable BER in the back-channel data once the first convergence criterion is satisfied.

5. The communication system of claim 1 the second control module is configured to start the second iterated operation by dithering and adjusting the transmission frequency upon a reception of the real-time variable BER in the back-channel data until a second convergence criterion for the second transmitter is satisfied, and to stop adjusting the transmission frequency despite dithering upon a reception of the constant BER in the back-channel data.

6. The communication system of claim 4, wherein the first convergence criterion comprises a limited recent average movement of a set point of the DLI in recent iterations of the first iterated operation.

7. The communication system of claim 4, wherein the first convergence criterion comprises a limited change of the BER over recent iterations of the first iterated operation.

8. The communication system of claim 4, wherein the first convergence criterion comprises a fixed number of dither steps for increasing or decreasing delay-phases of the DLI around a nominal set point over recent iterations of the first iterated operation.

9. The communication system of claim 5, wherein the second convergence criterion comprises a limited change of the BER over recent iterations of the second iterated operation.

10. The communication system of claim 5, wherein the second convergence criterion comprises a fixed number of dither steps for increasing or decreasing transmission frequency around a nominal set point of the second transmitter over recent iterations of the second iterated operation.

11. The communication system of claim 5, wherein the second convergence criterion comprises a limited recent average movement of a set point of the second transmitter in recent iterations of the first iterated operation.

12. A method for tracking an optical signal in receive side of a communication system, the communication system comprising:
   a communication link;
   a first transceiver comprising a first control module and a first receiver; and
   a second transceiver comprising a second control module and a second transmitter, the second transceiver being configured to send an optical signal via the communication link to the first transceiver and receive back-channel data from the first transceiver;
   the method comprising:
   receiving an optical signal by the first control module coupled with a delay line interferometer (DLI) in the first receiver;

calculating a first bit-error-rate (BER) of the optical signal;

determining the DLI to have a low signal-to-noise ratio based on that the first BER meets a threshold;

configuring a constant BER to a back-channel data;

transmitting the back-channel data from the first receiver to a second transmitter to generates an optical signal with a fixed wavelength;

adjusting a set point of the DLI in a first iterated operation for the optical signal transmitted from the second transmitter to the first receiver to result in a second BER of the optical signal converged to a value smaller than the first BER.

13. The method of claim 12 wherein the communication link comprises an optical fiber.

14. The method of claim 12 wherein the first iterated operation comprises dithering and adjusting the set point of the DLI using the first BER as a proportional integral derivative parameter in a gradient descent search of an optimized set point until the second BER satisfies a first convergence criterion.

15. The method of claim 14 wherein the first convergence criterion comprises a limited recent average movement of a set point of the DLI in recent iterations of the first iterated operation.

16. The method of claim 14 further comprising holding the optimized set point of the DLI and transmitting the second BER in real time as back-channel data from the first receiver to the second transmitter of the communication system to adjust a transmitter setting in a second iterated operation to result in a third BER converged to a value no greater than the second BER.

17. The method of claim 16 wherein the second iterated operation comprises dithering and adjusting the transmitter setting using the second BER as a proportional integral derivative parameter in a gradient descent search of an optimized transmitter setting to obtain a third BER until a second convergence criterion is satisfied.

18. The method of claim 17 wherein the second convergence criterion comprises a limited change of the third BER over recent iterations of the second iterated operation.

19. The method of claim 17 further comprising, based on a determination that the first BER does not meet the threshold, searching a parameter space associated with the set point of the DLI from a current set point or a last-known good set point to search a restart set point associated with a fourth BER until the fourth BER meets the threshold.

20. The method of claim 19 wherein searching a parameter space comprises performing a spiral search in a two-dimensional parameter space defined by a first set point for controlling a first DLI receiving a Transverse Magnetic mode signal of the optical signal and a second set point for controlling a second DLI receiving a Transverse Electric mode signal of the optical signal.

* * * * *